United States Patent
Kaiser

(10) Patent No.: US 7,828,965 B2
(45) Date of Patent: Nov. 9, 2010

(54) WATER PREPARATION DEVICE, IN PARTICULAR FOR A DRAIN CLEANING VEHICLE

(75) Inventor: Dietmar Kaiser, Schaanwald (LI)

(73) Assignee: Dietmar Kaiser AG, Schaanwald (LI)

( * ) Notice: Subject to any disclaimer, the term of this patent is extended or adjusted under 35 U.S.C. 154(b) by 311 days.

(21) Appl. No.: 10/560,240

(22) PCT Filed: May 28, 2004

(86) PCT No.: PCT/CH2004/000323

§ 371 (c)(1),
(2), (4) Date: Aug. 2, 2006

(87) PCT Pub. No.: WO2004/111355

PCT Pub. Date: Dec. 23, 2004

(65) Prior Publication Data

US 2007/0125705 A1   Jun. 7, 2007

(30) Foreign Application Priority Data

Jun. 12, 2003   (CH) .................................... 1024/03

(51) Int. Cl.
*B01D 19/00* (2006.01)
*C02F 1/20* (2006.01)
*C02F 9/00* (2006.01)

(52) U.S. Cl. .................... 210/188; 210/241; 210/257.1; 210/258; 210/259; 210/320; 210/512.1

(58) Field of Classification Search .............. 210/195.1, 210/172.1, 256, 257.1, 241, 258, 259, 304, 210/315, 416.1, 512.1, 188, 260, 261, 320, 210/278, 424, 425, 426, 512.12; 15/313; 95/253, 261, 267, 271

See application file for complete search history.

(56) References Cited

U.S. PATENT DOCUMENTS

| | | | | |
|---|---|---|---|---|
| 3,684,093 A | * | 8/1972 | Kono et al. | 210/788 |
| 4,199,837 A | * | 4/1980 | Fisco, Jr. | 15/302 |
| 4,475,264 A | * | 10/1984 | Schulz | 15/321 |
| 5,203,999 A | * | 4/1993 | Hugues | 210/512.3 |
| 5,312,551 A | * | 5/1994 | Perron et al. | 210/257.1 |
| 5,326,383 A | * | 7/1994 | Harris | 96/349 |
| 5,430,910 A | * | 7/1995 | Wiley | 15/321 |
| 5,968,370 A | * | 10/1999 | Trim | 210/805 |
| 6,013,138 A | | 1/2000 | Sinz | |

FOREIGN PATENT DOCUMENTS

CH   630684 A * 6/1982

OTHER PUBLICATIONS

Machine translation of CH 630684 (translation obtained from Espacenet Jan. 2010).*

* cited by examiner

*Primary Examiner*—Matthew O Savage
*Assistant Examiner*—Lucas Stelling
(74) *Attorney, Agent, or Firm*—Morriss, O'Bryant, Compagni, P.C.

(57) ABSTRACT

A water treatment arrangement which can, for example, be used in a sewer cleaning vehicle is described. An exemplary arrangement includes a separation device for a supplied mud-water mixture and a water tank which is connected to it for cleaned water. The separation device and the water tank can form a structural unit. The separation device for the mud-water mixture can be surrounded, at least in areas, by the water tank for cleaned water.

18 Claims, 2 Drawing Sheets

WATER PREPARATION DEVICE, IN PARTICULAR FOR A DRAIN CLEANING VEHICLE

BACKGROUND

The invention relates to a water treatment arrangement which can, for example, be used with a sewer cleaning vehicle.

Municipal vehicles, especially sewer cleaning vehicles, are used mainly to clean sewers and the like. They are also used to clear sewer clogs, for street cleaning after heavy precipitation with trash accumulation, floods, for sucking dirt and mud out of containers and tanks, and so forth. They comprise a tank which is mounted on the chassis of a truck and which is divided into several chambers. The generally cylindrically made, barrel-like tank can be arranged horizontally. In one version of these sewer cleaning vehicles known from the prior art, the tank viewed from the back end of the vehicle has a first larger chamber, in which stones, gravel and mud settle out of the mud-water mixture which has been picked up by a suction hose. The mud chamber in the direction of the cab has a separation chamber in which the mud-water mixture which has been entrained with suction air is separated from the latter and the water is separated from the mud. Toward the cab a fresh water tank follows; it is used to store fresh water which is used to clean sewers, tanks and barrels which have been cleaned beforehand with a high pressure water jet. There is a separate high pressure pump for producing the pressure which is necessary for this purpose. The negative pressure which is necessary for sucking up the water-mud mixture is produced by a vacuum pump, for example a water ring pump, which is located within the fresh water chamber in the known embodiment.

The fresh water chamber and the separator occupy a large part of the tank volume. This volume is lacking in the mud chamber for holding the suctioned mud. For this reason the mud chamber reaches the maximum fill level more quickly and the cleaning process must be interrupted to empty it. Moreover, the mud chamber which can assume a relatively great weight in operation is located very far to the back on the vehicle. In conjunction with the boom located on the back end of the tank for the mud suction hose and the reel mounted on the end of the tank for the high pressure hose, a very unfavorable weight distribution of the sewer cleaning vehicle results. This can lead to excess wear on the rear wheels of the vehicle. The unfavorable center of gravity can even lead to the steerability of the vehicle being adversely affected.

To remedy this situation, in another known sewer cleaning vehicle it has been proposed that a water treatment device which includes the separator and fresh water tank be moved out of the horizontal cylindrical tank. In this arrangement, between the cab and the tank above the vehicle frame, a space is left open and holds the fresh water tank, the separator, for example a cyclone, and the vacuum pump, generally a water ring pump. The water ring pump is located between the separator and the fresh water tank which are mounted on the right and left on the vehicle frame. This arrangement makes it possible to make the mud tank longer. The increase in the volume provides for longer, uninterrupted operation and also improves the weight distribution on the vehicle. The disadvantage in this arrangement is that the width of the vehicle is relatively great due to the lateral arrangement of the separator and the fresh water tank. This can lead to adverse effects in use of the sewer cleaning vehicle under the narrow conditions of European municipalities.

SUMMARY

A water treatment is disclosed arrangement, comprising: a separation device for a mud-water mixture which has been supplied with intaken air; and a water tank which is connected to it for cleaned water, wherein the separation device and the water tank form a structural unit and the separation device for the air-mud-water mixture is surrounded at least in areas by the water tank for the cleaned water.

BRIEF DESCRIPTION OF THE DRAWINGS

Other advantages and features follow from the description of an embodiment and its use in a sewer cleaning vehicle. The schematics are not to scale.

DETAILED DESCRIPTION

Figure 1:
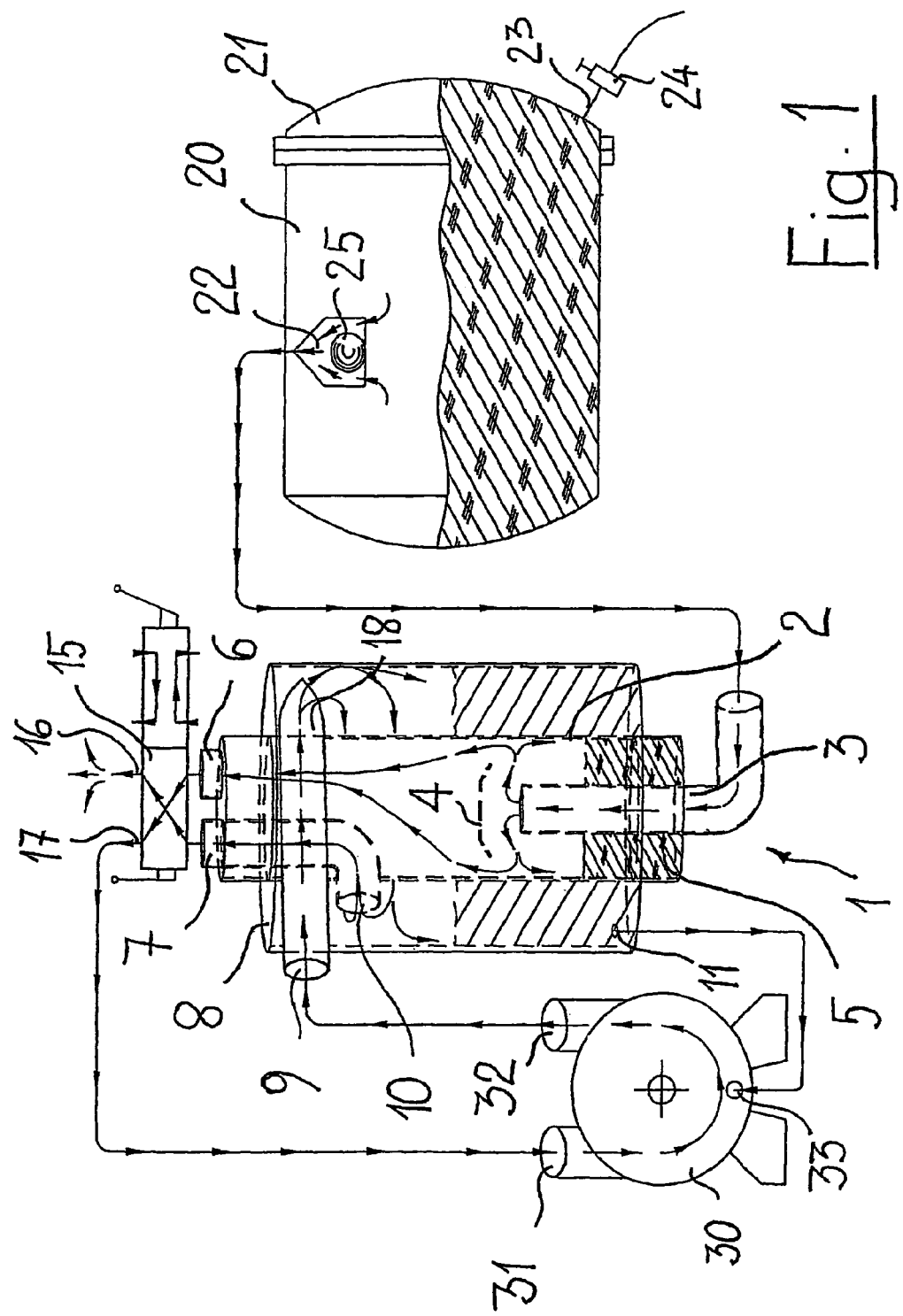
FIG. 1 shows an exemplary water treatment arrangement in interaction with a vacuum means, for example a water ring pump, and a mud tank.

A water treatment arrangement as disclosed herein can be mounted in a space-saving manner on, for example, a sewer cleaning vehicle. The water treatment arrangement can be configured as a water treatment means designed to make it possible to equip a sewer cleaning vehicle with a mud tank having a relatively large volume, and to enable a favorable weight distribution and arrangement of the center of gravity. The water treatment means in an exemplary embodiment is to be made as compact as possible so that when mounted on a sewer cleaning vehicle, the width of the vehicle can be kept as small as possible and even under narrower road conditions full utility of the vehicle can be ensured.

An exemplary water treatment arrangement, such as for a sewer cleaning vehicle, comprises a separation device for a supplied air-mud-water mixture and a water tank which is connected to it for cleaned water. The separation device and the water tank form a structural unit. The separation device for the air-mud-water mixture can be surrounded at least in areas by the water tank for the cleaned water.

The separation device for the water-mud mixture and the water tank for the cleaned water can be combined into a structural unit and can be transported, manipulated and mounted integrally. An exemplary water treatment means is made compact and space-saving by the water tank's at least partially surrounding the separation device for the mud-water mixture. Especially for installation on the sewer cleaning vehicle this enables a space-saving arrangement of the water treatment means and better weight distribution of the vehicle. The space gained can be used for example for a larger mud tank.

In one especially space-saving design of the water treatment means, the separation device and the water tank are arranged essentially concentrically. The water tank for example has an essentially cylindrical shape. The separation device is then also made cylindrical. The arrangement is then essentially coaxial.

The separation device for the mud-water mixture is made as a mud separator with a reservoir for the separated mud. The separation device exploits the force of gravity. The mud-water mixture is delivered into the separation device via a pipe at the point which is lowest in its position of use and is routed against for example a screen-like baffle plate. The mud settles on the base of the separation device in the mud reservoir. The cleaned air flows on to an outlet opening. The air flow is routed to the water ring pump in connection with the latter.

So that the water treatment means can be made as compact as possible, it can be advantageous to make the separation device as slender as possible. Due to the flow distance which is desired for reliable separation of the mud-water mixture, the separation device can have a larger overall height than the water tank. So that the compact designed is preserved, the separation device which is located vertically in its position of use penetrates the water tank in the axial direction.

One section of the water tank of the water treatment means can be advantageously made as a water separator. For example, the water separator is made as a cyclone. The air which has been compressed by the water ring pump is mixed in known fashion with water drops from the water ring pump. To recover the water, the compressed air is routed by way of the inflow opening in the water tank into the water separator. It is advantageously made as a cyclone. The air mixed with the water drops is ordinarily routed roughly tangentially into the cyclone. There the water drops which have been entrained with the air are separated into the water tank. The air from which the water drops have been removed is blown into the open.

To recycle the water, the water tank is provided with at least one outlet by way of which water can be withdrawn for example from a water ring pump.

The water treatment means is made as a structural unit. So that it can be combined easily with existing hardware components, for example a sewer cleaning vehicle, the water tank surrounding the separation device is equipped with feed and drain connections for the intaken air. This makes it possible to easily connect the water treatment means to the vacuum means, for example a water ring pump. In this way the prerequisites are created for making the water treatment means independent of the configuration of the mud tank. The water treatment means can also be mounted for example on existing sewer cleaning vehicles in place of the separate separation device and the separate water tank since all necessary connections are already integrated. A manufacturer of sewer cleaning vehicles can thus procure the water treatment means independently of the vehicle components; this increases his economic flexibility.

For operation of the water treatment means, especially on a sewer cleaning vehicle, it is advantageous if it is already equipped with an integrated switching means for the air flows into and out of the separation device and the water tank. The switching means, generally a four-way switch, is matched to the requirements of the water treatment means and need only be connected to a power supply source, for example to the electrical system of the sewer cleaning vehicle.

An exemplary sewer cleaning vehicle equipped with a disclosed water treatment means can have more space due to the compact dimensions of the water treatment means. This space can be used for example to increase the volume of the mud tank. The compact execution of the water treatment means allows installation in a vertical state next to the required vacuum pump, for example a water ring pump, between the cab and a horizontally arranged mud tank. The vacuum pump, in many cases a water ring pump, takes water directly from the water tank which is located next to it. The negative pressure which is produced is used to intake both the mud-water mixture and the cleaned water, but also to support separation of the mud water-mixture in the cyclone. The suction distances can be kept small by the advantageous arrangement of the water ring pump and the water treatment means. This can have advantages for the attainable vacuum performance. The space which has been gained by the space-saving arrangement can be used to move the mud tank farther in the direction of the cab. This can improve the weight distribution and the location of the center of gravity of the sewer cleaning vehicle. It can thus also be more easily and safely maneuvered.

The prior art discloses sewer cleaning vehicles in which the mud tank is tipped to empty it. According to an exemplary embodiment disclosed herein, because of the complete separation of the water treatment means from the mud tank, only the mud tank need be tipped. The water treatment means maintains its position on the vehicle unchanged when the mud tank is tipped. This simplifies construction. The mass to be tipped is reduced by the mud tank alone having to the tipped to empty it; this entails advantages with respect to the fuel consumption of the sewer cleaning vehicle.

FIG. 1 shows an exemplary water treatment arrangement represented as a means which bears reference number 1 overall, in interaction with a mud tank 20 and with a vacuum pump 30, especially with a water ring pump. When sewers are being suctioned, rocks, gravel and mud are collected in the mud tank 20. The air which is suctioned by way of the intake opening 22 of the mud tank 20, which opening is provided with a valve 25, always entrains a mud-water mixture which can be separated in the water treatment means 1 before the air is delivered again to the vacuum pump 30.

The water treatment means 1 can include a separation device 2 for a suctioned mud-water mixture which is located essentially concentrically or coaxially to the water tank 8 for the cleaned water. The separation device 2 and the water tank 8 have an essentially cylindrical shape and are arranged vertically in the position of use of the water treatment means 1.

The separation device 2 at its lowest point has an inlet 3 for the mud-water mixture which has been entrained with the intaken air. The cylindrical inlet connection 3 ends in front of the baffle plate 4. The entrained mud-water mixture sprays against the baffle plate and settles on the bottom of the separation device 2 in a mud reservoir 5. The air flows on by way of the outlet opening 6 of the separation device and an outlet 17 in the direction of the vacuum pump 30 which is made as a water ring pump. The air generally picks up water drops in the water ring pump 30. Ordinarily the now compressed air which is mixed with water drops travels by way of the inflow opening 9 in the water tank 8 somewhat tangentially into a section of the water tank 8 which is made advantageously as a cyclone 18. There the water drops which have been entrained with the air are separated into the water tank 8. The air from which the water drops have been removed travels by way of an outflow opening 10 of the water tank 8 which is connected to the outflow opening 7 of the separation device 2, and an outlet 16 into the open.

There are an outlet 16 to the open and an outlet 17 in the direction of the water ring pump on a switching device which is labelled with reference number 15. The switching device 15 is made as a four-way valve and provides for control of the air flows out of the separation device 2 and out of the water tank 8. Advantageously the switching device is connected to the water treatment means 1 to form a structural unit which can be handled jointly. The inlets of the switching device 15 coincide with the outflow openings 6, 7 of the separation device 2. The switching device 15 provides for routing the air flows via the outlets 6 and 7 of the separation device 2.

The right half of the symbolically shown switching device 15 indicates a second operating state and the pertinent flow directions by the corresponding arrows. In this case which is necessary for example to empty the water treatment means 1 and also the mud tank 20, the air flows are reversed. The water ring pump 30 intakes air via the outlets 16, 17 from the vicinity. The compressed air which optionally entrains water drops from the water ring pump 30 is routed via openings 9, 10, 7 and 6 into the water tank 8 and the separation device 2. From there it travels via the inlet 3 of the separation device 2 and the suction opening 22, 25 into the mud tank 20 as well.

The water treatment means 1 is connected via the switching device to one inlet 31 of the water ring pump 30. Water ring pumps have been long known from the prior art, and one consists of a cylindrical housing in which an impeller with radial, straight or curved blades is located. The shaft of the impeller is supported eccentrically to the surrounding housing. The housing is partially filled with water via a line. In the illustrated embodiment the water ring pump is supplied with water via a line which connects the outlet 11 in the water tank 8 to the inlet 33 in the housing of the water ring pump 30. When the impeller rotates, a water ring is formed in the housing and the blades dip more or less deeply into the ring due to the eccentric support of the shaft. The individual cells which are divided by the blades of the impeller in the water ring periodically become larger or smaller during rotation. Suction and pressure openings are mounted in the side covers of the housing such that the suction openings are located in the area of the enlarging cells, the pressure openings in the area of the diminishing cells. The air which has been intaken through the inlet opening 31 is intaken by the enlargement of the cell volumes, is compressed when the cell volumes become smaller, and is pressed out of the water ring pump through the pressure opening 32. In any case, the water entrained with the compressed air travels via the inlet 9 in the water tank into the area of the cyclone 18, is separated from the air there, and settles in the water tank 8. There it is ready again for supplying the water ring pump 30 with water. The air is released into the vicinity via the switching device 15.

The mud tank 20 which is arranged horizontally has a cover 21 which can be swivelled up and through which the dirt, rocks, gravel and mud which have settled in the tank can be emptied. In the cover area there is also a drain line 23 with a stop valve 24 via which liquid components can be drained before emptying the mud tank.

Figure 2:
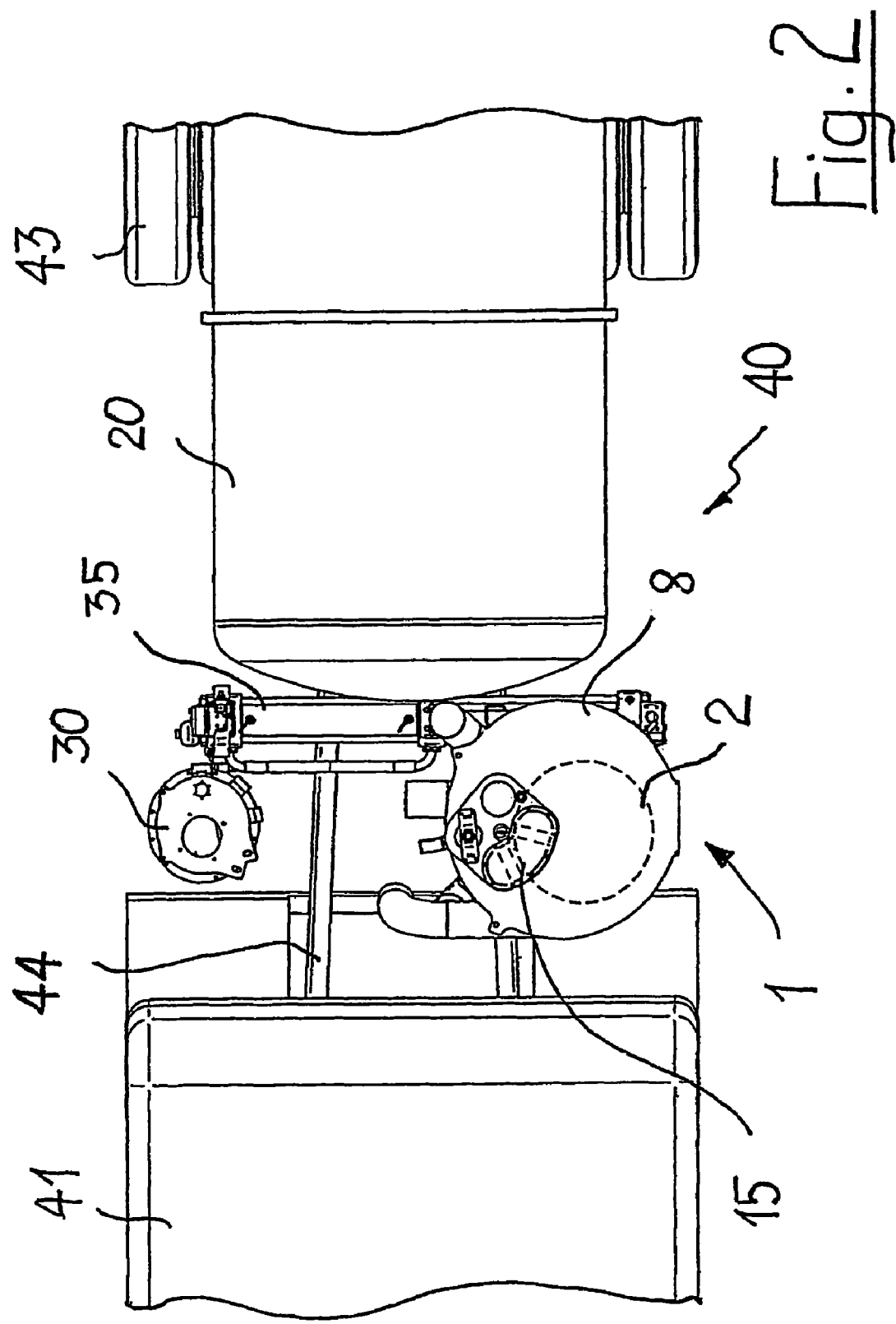
FIG. 2 shows a water treatment arrangement on a sewer cleaning vehicle.

FIG. 2 shows the exemplary arrangement of the water treatment means 1 on a sewer cleaning vehicle which is labelled with reference number 40 overall. The water treatment means 1 with a separation device 2 which is surrounded by the water tank 8 follows the cab 41 which is located over the front axle, next to the vacuum pump 30 on the frame 44 of the vehicle 40. A high pressure pump which is used to generate the high pressure for the water jet for sewer cleaning is labelled with reference number 35. It is supplied for example from the water tank 8 for the cleaned water. Therefore it can be advantageous if the high pressure pump is likewise located in the vicinity of the water treatment means 1. In FIG. 2 it is mounted on the vehicle frame 44. In one alternative version it can however also be located underneath the frame for reasons of space. In this case it can also be moved farther in the direction of the cab 41. The mud tank is labelled 20; it is moved farther in the direction of the cab 41 due to the space-saving execution and arrangement of the water treatment means 1. In this way the main load of the mud tank 20 is moved in front of or over the rear axles of the sewer cleaning vehicle 40 which are labelled with reference number 43. The improved weight distribution has advantages with respect to the maneuverability of the vehicle and also leads to more uniform tire wear. The mud tank 20 can be made with a greater volume by virtue of the compact execution of the water treatment means 1. In this way the intervals in which the mud tank must be emptied are made longer and the effective service life of the sewer cleaning vehicle can be prolonged.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An apparatus for separating mud from water of an air-mud-water mixture, comprising:

a water tank defining a water reservoir and having a water tank inlet and a first water tank outlet in an upper portion thereof and a second water tank outlet in a bottom portion thereof;

a separation device defining a mud-water reservoir and coupled to and disposed at least partially within the water tank and extending into the water tank so that the water tank at least partially surrounds the separation device, the water and mud-water reservoirs being separated by at least one wall of the separation device to prevent direct fluid communication between the water and mud-water reservoirs, and having a separation device inlet with a first end configured to be in fluid communication with a mud tank and a second end configured to be in fluid communication with the separation device in an upper portion of the separation device such that an air-mud-water mixture being pumped through the separation device inlet enters the separation device with mud and water in the air-mud-water mixture settling into the mud-water reservoir and air from the air-mud-water mixture being pumped through an outlet in a top portion of the separation device and into the water reservoir; and a water ring pump coupled between and in fluid communication with the outlet of the separation device and the water tank inlet for pumping air from the separation device and air entrained water droplets into the water tank;

wherein the water tank inlet is oriented approximately tangentially to an outer wall of the water tank to cause cyclonic separation of the air entrained water droplets from the air, allowing the resulting water to collect in the water tank and the air to exit through the first water tank outlet.

2. The apparatus of claim 1, further comprising a baffle positioned within the second reservoir and spaced from the second open end of the separation device inlet so that the air-mud-water mixture being pumped through the separation device inlet sprays against the baffle to deflect the mud and water into the mud-water reservoir.

3. The apparatus of claim 1, wherein the water ring pump is coupled to and in fluid communication with the second water tank outlet for drawing water out of the water tank for use in operating the water ring pump.

4. The apparatus of claim 1, further comprising a four-way valve having first and second valve inlets and first and second valve outlets, the first and second valve inlets being coupled to the water tank and separation device outlets, the first valve outlet being coupled to the pump and the second valve outlet being open to the vicinity, wherein in a first state the four-way valve directs a flow from the separation device outlet to the first valve outlet and from the water tank outlet to the second valve outlet and in a second state the four-way valve directs a flow from the second valve outlet to the first valve outlet and from the water tank outlet to the separation device outlet.

5. The apparatus of claim 1, further comprising a mud tank separate and apart from the separation device having a mud tank outlet in fluid communication with the separation device inlet.

6. The apparatus of claim 5, wherein the mud tank is substantially horizontally oriented and comprises a cover on one end thereof configured to be swivelled upwardly to allow removal of solid materials contained therein.

7. The apparatus of claim 1, wherein the separation device is substantially enveloped by the water tank and wherein an outer wall of the separation device forms an inner wall of the water tank.

8. The apparatus of claim 7, wherein the water tank and separation device are substantially cylindrically shaped and an air-water mixture flowing into the water tank inlet is directed substantially tangentially to an inner cylindrical wall of the water tank to form a cyclone in the water tank.

9. An apparatus for separating water from a mud-water mixture, comprising:
   a water ring pump having a pump inlet and a pump outlet;
   a water tank defining a water reservoir and having a water tank inlet coupled to the pump outlet, a first water tank outlet coupled to the water ring pump to supply water to the water ring pump for operation of the water ring pump and a second water tank outlet in an upper portion thereof, the water tank inlet being oriented approximately tangentially to a wall of the water tank to form a cyclonic separator in the water tank;
   a gravitational separation device defining a mud-water reservoir in a lower portion thereof and coupled to and disposed at least partially within the water tank so that the water tank at least partially surrounds the separation device, the water and mud-water reservoirs being separated by walls of the separation device to prevent direct fluid communication between the water and mud-water reservoirs, and a separation device inlet having a first open end in fluid communication with a mud tank and a second open end in fluid communication with the separation device at a position above the mud-water reservoir;
   whereby an air-mud-water mixture being pumped by the water ring pump through the separation device inlet sprays into the separation device causing mud and water in the air-mud-water mixture to settle into the mud-water reservoir and the air to be pumped through an outlet in an upper portion of the separation device, through the water ring pump and into the water tank through the water tank inlet, separating water droplets from the air by cyclonic separation, depositing the resulting water in the water reservoir and forcing air within the water tank to flow out of the water tank through the water tank outlet.

10. The apparatus of claim 8, further comprising a baffle positioned within the second reservoir and spaced from the second open end of the separation device inlet so that the air-mud-water mixture being pumped through the separation device inlet sprays against the baffle.

11. The apparatus of claim 8, wherein the separation device is at least partially housed within the water tank.

12. The apparatus of claim 8, further comprising a four-way valve having first and second valve inlets and first and second valve outlets, the first and second valve inlets being coupled to the water tank and separation device outlets, the first valve outlet being coupled to a pump that is coupled to the water tank inlet and the second valve outlet being in fluid communication with the vicinity.

13. The apparatus of claim 12, wherein in a first state the four-way valve directs a flow from the separation device outlet to the first valve outlet and from the water tank outlet to the second valve outlet and in a second state the four-way valve directs a flow from the second valve outlet to the first valve outlet and from the water tank outlet to the separation device outlet.

14. The apparatus of claim 9, wherein the separation device inlet comprises a tube substantially vertically extending within the second reservoir from a bottom of the separation device defining the mud reservoir between the tube and the walls of the separation device and the baffle is positioned above the open end of the separation device inlet.

15. The apparatus of claim 8, wherein the mud tank is separate and apart from the water tank and separation device.

16. The apparatus of claim 15, wherein the mud tank is substantially horizontally oriented and comprises a cover on one end thereof configured to be swivelled upwardly to allow removal of solid materials contained therein.

17. The apparatus of claim 8, wherein the separation device is contained within and surrounded by the water tank, with the separation device and water tank sharing a common wall.

18. The apparatus of claim 17, wherein the water tank and separation device are substantially cylindrically shaped and an air-water mixture flowing into the water tank inlet is directed substantially tangentially to a curved wall of the water tank to form the cyclonic separator in the water tank.

* * * * *